(12) United States Patent
Jaffar et al.

(10) Patent No.: US 7,212,287 B2
(45) Date of Patent: May 1, 2007

(54) PROVIDING OPTICAL FEEDBACK ON LIGHT COLOR

(75) Inventors: Rizal Jaffar, Melaka (MY); Len Li Kevin Lim, Perak (MY); Joon Chok Lee, Sarawak (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 388 days.

(21) Appl. No.: 10/912,394

(22) Filed: Aug. 5, 2004

(65) Prior Publication Data
US 2005/0030538 A1 Feb. 10, 2005

(51) Int. Cl.
*G01N 21/25* (2006.01)
(52) U.S. Cl. .................. 356/405; 356/402; 315/150; 315/10
(58) Field of Classification Search ............... 356/402, 356/405, 319; 250/205; 315/10, 30, 145, 315/150
See application file for complete search history.

(56) References Cited

U.S. PATENT DOCUMENTS

| | | | |
|---|---|---|---|
| 4,412,744 A * | 11/1983 | Lee et al. | ............... 356/319 |
| 6,344,641 B1 | 2/2002 | Blalock et al. | |
| 6,448,550 B1 | 9/2002 | Nishimura | |
| 6,507,159 B2 | 1/2003 | Muthu | |
| 6,552,495 B1 * | 4/2003 | Chang | ............... 315/169.3 |
| 6,600,562 B1 * | 7/2003 | Chang | ............... 356/405 |
| 7,009,343 B2 * | 3/2006 | Lim et al. | ............... 315/150 |

* cited by examiner

*Primary Examiner*—Layla G. Lauchman

(57) ABSTRACT

Optical feedback for controlling color of light from a light source is provided. Incident optical energy of the light is detected as a function of discrete steps of wavelength. For each discrete step of wavelength, an X, Y and Z tristimulus subvalue is produced. All the X, Y and Z tristimulus subvalues for all the discrete steps are summed together to produce an X, Y and Z tristimulus value for the light. The X, Y and Z tristimulus values are used as feedback in controlling color of the light generated by the light source.

20 Claims, 4 Drawing Sheets

PROVIDING OPTICAL FEEDBACK ON LIGHT COLOR

BACKGROUND

In order to detect and determine color of light from a light source, color filters are used to separate out components of light. The resulting intensity of each component is detected in order to determine light color.

For example, when trying to match color using the Commission Internationale de l'Eclairage (CIE) 1931 color matching function (CMF), a light sensor with a red color filter, a light sensor with a green color filter and a light sensor with a blue color filter are used to detect red, green and blue components of light. A transfer function is used to convert the detected red, green and blue components to X, Y and Z tristimulus values used by the CIE 1931 CMF. One disadvantage of this system is that filters are expensive and degrade over time. Additionally, because filters do not exactly correspond with X, Y and Z tristimulus values used by the CIE 1931 CMF, it is necessary to use an intermediate color space and a transfer function to convert detected color components to X, Y and Z values.

SUMMARY OF THE INVENTION

In accordance with an embodiment of the present invention, optical feedback for controlling color of light from a light source is provided. Incident optical energy of the light is detected as a function of discrete steps of wavelength. For each discrete step of wavelength, an X, Y and Z tristimulus subvalue is produced. The X, Y and Z tristimulus subvalues for all the discrete steps are summed together to produce an X, Y and Z tristimulus value for the detected light. The X, Y and Z tristimulus values are used as feedback in controlling color of the light generated by the light source.

DESCRIPTION OF THE EMBODIMENT

Figure 1:
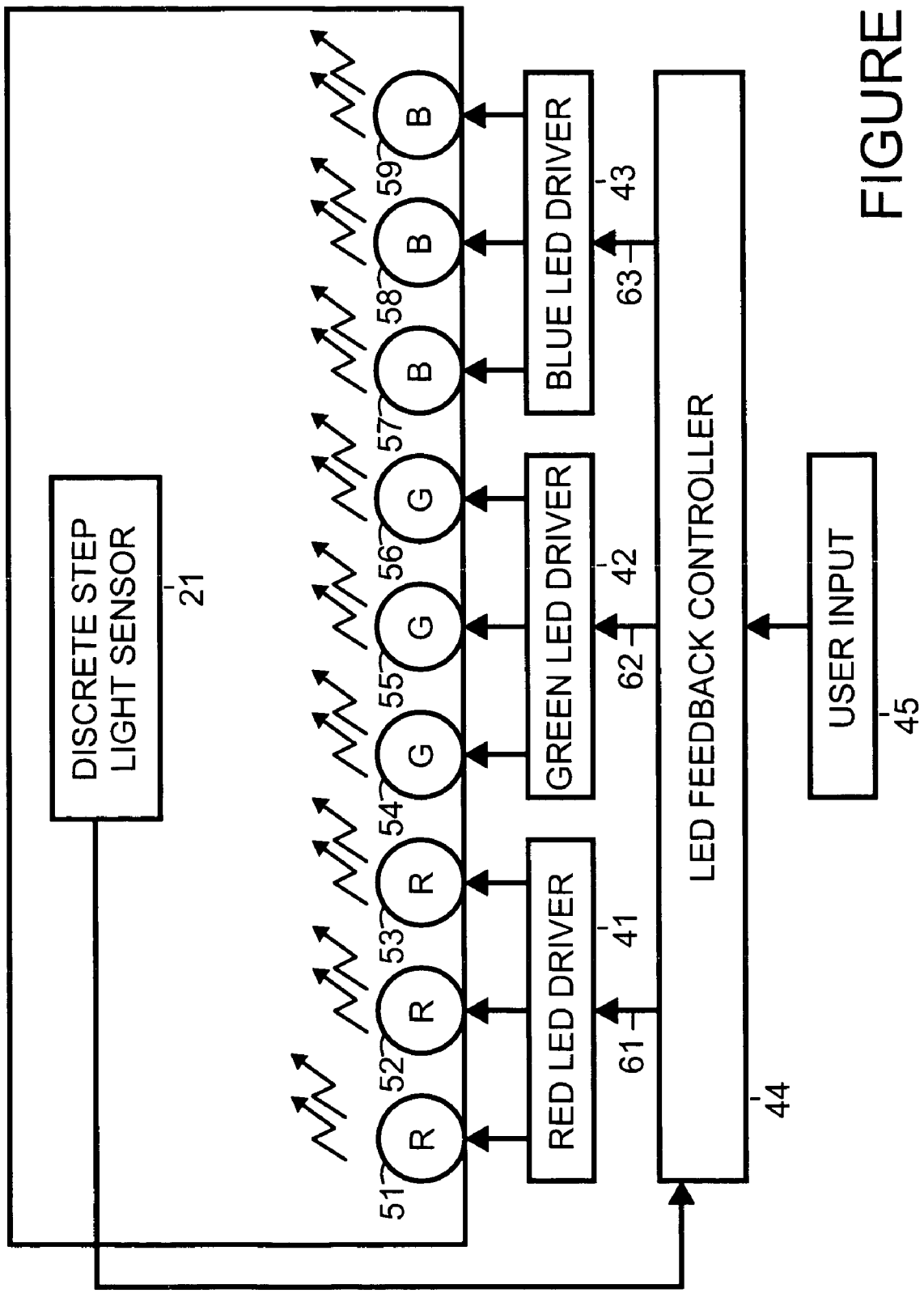
FIG. 1 is a simplified block diagram that illustrates providing optical feedback on light color in accordance with an embodiment of the present invention.

FIG. 1 is a simplified block diagram that illustrates providing optical feedback on light color in accordance with an embodiment of the present invention. In essence, an optical feedback system is used with a device that produces feedback spectral content signals. Knowing the spectral content allows the feedback system to use the CIE color matching functions (CMF) to calculate the standard CIE X, Y and Z tristimulus values. This allows for a feedback process that removes dependency on color filter characteristics and removes the requirement of a calibration step for the filters.

A red light-emitting diode (LED) driver 41 provides drive current to a red LED 51, a red LED 52 and a red LED 53. A green LED driver 42 provides drive current to a green LED 54, a green LED 55 and a green LED 56. A blue LED driver 43 provides drive current to a blue LED 57, a blue LED 58 and a blue LED 59. LEDs 51 through 59 are illustrative. For example, different numbers of LED can be used. Likewise, light-emitting devices other than LEDs can be used to provide light. Additionally, LEDs of different colors can be used instead of, or in addition to, red, green and blue.

An LED feedback controller 44 controls red LED driver 41, green LED driver 42 and blue LED driver 43. LED feedback controller 44 controls the values placed on a red LED driver control signal 61, a green LED driver control signal 62 and a blue LED driver control signal 63 so that the color produced by LEDs 51 through 59 matches a color selected by user input 45. For example, feedback controller 44 calculates red LED driver control signal 61 based on the error between the X, Y and Z tristimulus values measured by a discrete step light sensor 21 and X, Y and Z tristimulus values LED feedback controller 44 receives from user input 45. Feedback controller 44 calculates green LED driver control signal 62 based on the error between the X, Y and Z tristimulus values measured by discrete step light sensor 21 and the X, Y and Z tristimulus values LED feedback controller 44 receives from user input 45. Feedback controller 44 calculates blue LED driver control signal 63 based on the error between the X, Y and Z tristimulus values measured by discrete step light sensor 21 and the X, Y and Z tristimulus values LED feedback controller 44 receives from user input 45. Discrete step light sensor 21 produces a spectrum of light in discrete steps so that incident optical energy is spatially separated as a function of wavelength. For each discrete step, discrete step light sensor 21 detects light intensity. For example, discrete step light sensor 21 is implemented by a diffraction grating that diffracts light to a linear array of light-sensitive elements situated to receive different discrete steps of light. Alternatively, discrete step light sensor 21 is implemented by a prism that spreads light to a linear array of light-sensitive elements situated to receive different discrete steps of light. Alternatively, discrete step light sensor 21 is implemented by some other device that is able to detect incident optical energy as a function of discrete steps of wavelength.

Figure 2:
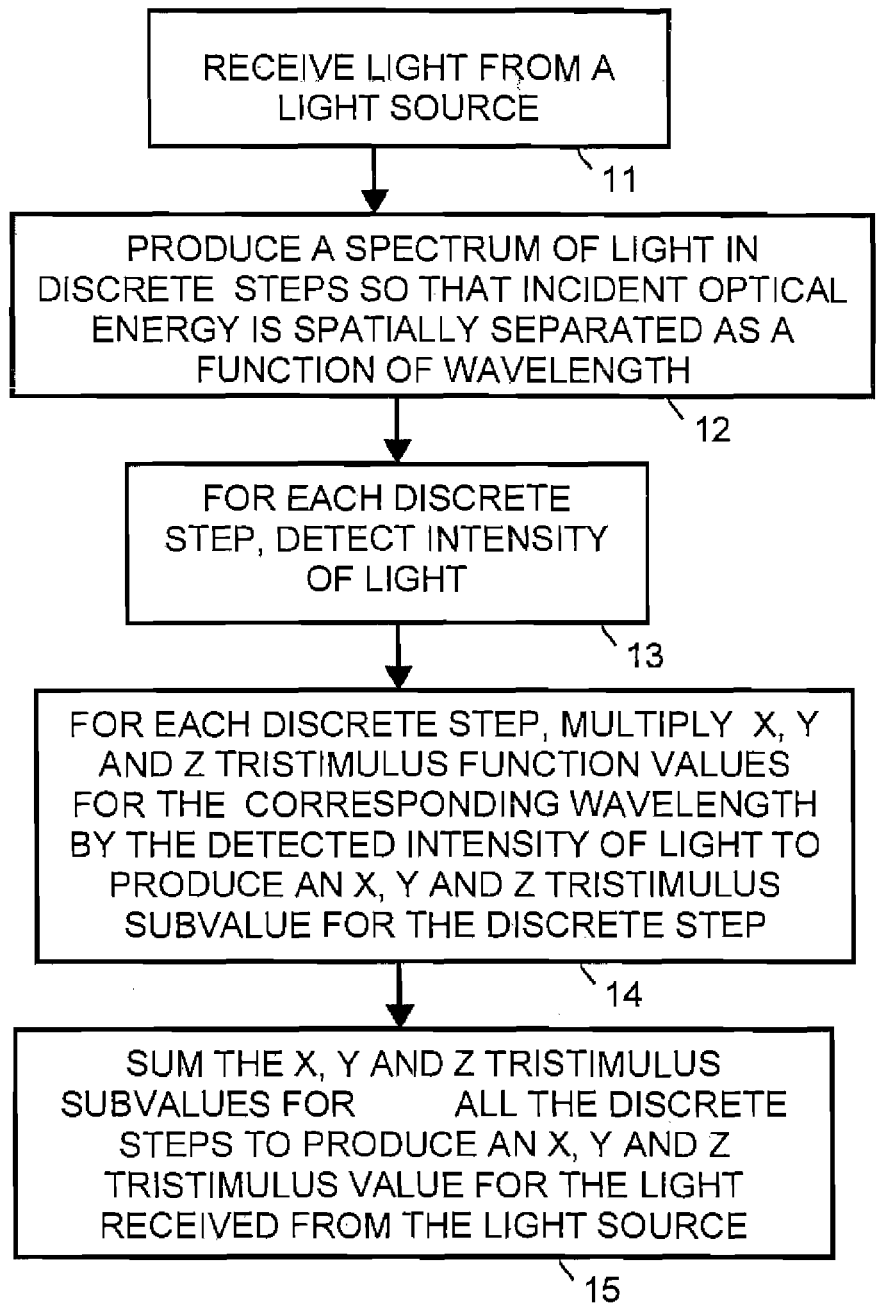
FIG. 2 is a simplified flowchart that illustrates color matching in accordance with an embodiment of the present invention.

FIG. 2 is a simplified flowchart that illustrates color matching in accordance with an embodiment of the present invention. In a block 11, light is received from a light source. For example, the light source is LEDs 51 through 59. In a block 12, a spectrum of light in discrete steps is produced so that incident optical energy is spatially separated as a function of wavelength. As discussed above, this may be performed by discrete step light sensor 21, for example, implemented using a prism, or a diffraction grating.

In a block 13, for each discrete step, light intensity is detected. For example, this can be performed by a linear array of photodiodes or other light-sensitive elements within discrete step light sensor 21. The linear array of photodiodes or other light-sensitive elements are situated to receive different discrete steps of light.

In a block 14, for each discrete step, X, Y and Z tristimulus function values for the corresponding wavelength are obtained. This is performed by LED feedback controller 44, for example, through use of a look-up table. An example of a table that lists X, Y and Z tristimulus function values for various light wavelength is listed, for example, in P. A. Keller, "Electronic Display Measurements—Concepts, Techniques and Instrumentation", ISBN 0-471-14857-1, Publisher: John Wiley, September 1997, pages 294–301. For each discrete step, the obtained X, Y and Z tristimulus function values are multiplied by the detected intensity of light to produce an X, Y and Z tristimulus subvalue for the discrete step In a block 15, the X, Y and Z tristimulus subvalues for all the discrete steps are summed together to produce an X, Y and Z tristimulus value for the light received from the light source.

The described determination of an X, Y and Z tristimulus value for light received from a light source is a significant improvement over traditional methods of color matching where a transfer function is used to convert detected red, green and blue components to X, Y and Z tristimulus values used by the CIE 1931 CMF. Improvements include the ability to obtain an exact match of CIE standard X, Y and Z tristimulus values, the elimination of the need for filters, and direct conversion to X, Y and Z tristimulus values without using an intermediate color space and a transfer function.

Figure 3:
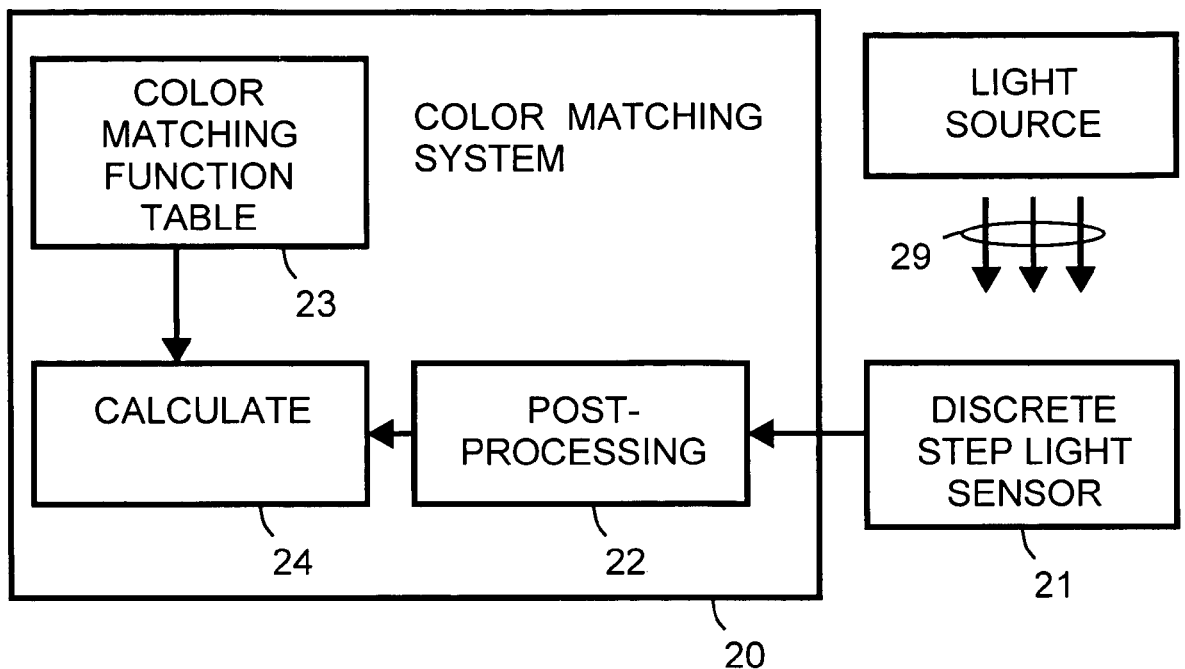
FIG. 3 is a simplified block diagram of a system that performs color matching in accordance with an embodiment of the present invention.

FIG. 3 is a simplified block diagram of a color matching system 20 within LED feedback controller 44. A CMF table 23 is used to store X, Y and Z tristimulus function values. For example, the CMF table 23 is a read only memory (ROM) that stores a CIE 1931 CMF table such as that shown in P. A. Keller, "Electronic Display Measurements—Concepts, Techniques and Instrumentation", ISBN 0-471-14857-1, Publisher: John Wiley, September 1997, pages 294–301.

Discrete step light sensor 21 receives light, represented by arrows 29, from a light source. For example, the light source is LEDs 51 through 59. Discrete step light sensor 21 produces a spectrum of light in discrete steps so that incident optical energy is spatially separated as a function of wavelength. For each discrete step, discrete step light sensor 21 detects light intensity. A post-processing block 22 receives from discrete step light sensor 21 the detected incident optical energy as a function of discrete steps of wavelength. Post-processing block 22 then performs any needed post-processing for a particular application. Depending upon the application, the post-processing can include, for example, normalization, interpolation, extrapolation, truncation, averaging and/or any other necessary or desired type of light detection post-processing.

The results of the post-processing is forwarded to a calculate block 24. For each discrete step, calculate block 24 obtains from CMF table 23 X, Y and Z tristimulus function values for the corresponding wavelength. For each discrete step, calculate block 24 produces an X, Y and Z tristimulus subvalue for the discrete step by multiplying the obtained X, Y and Z tristimulus function values by a value from post-processing block 22 that represents detected intensity of light. Calculate block 24 sums together the X, Y and Z tristimulus subvalues for all the discrete steps to produce an X, Y and Z tristimulus value for the light received by discrete step light sensor 21 from the light source.

When color matching system 20 is implemented as a separate chip, additional functionality is included within color matching system 20. When color matching system 20 is included on the same chip as LED feedback controller 44, it is not necessary to include this additional functionality specifically within color matching system 20 as it is already available within other portions of LED feedback controller 44. The additional functionality is shown in FIG. 4.

Figure 4:
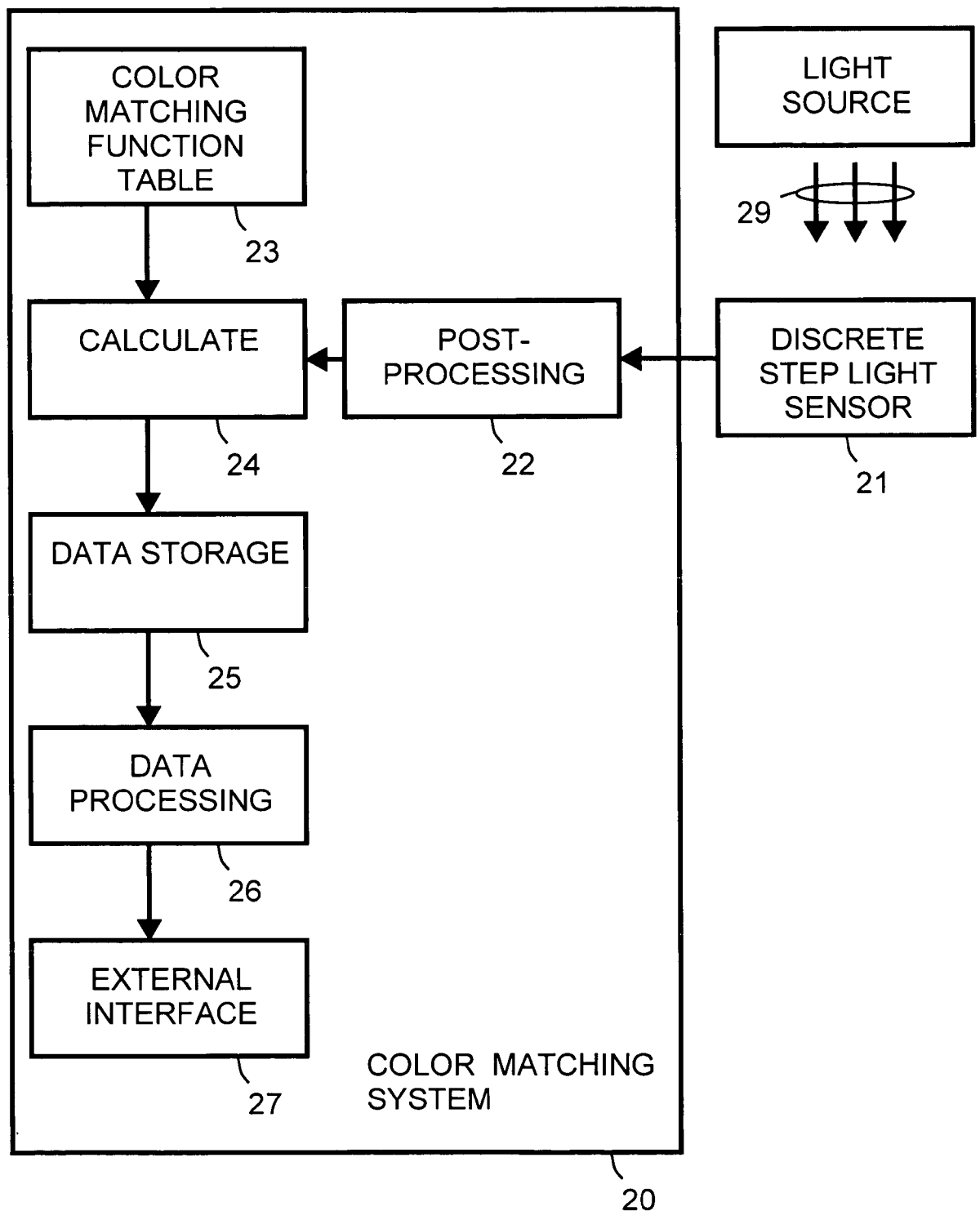
FIG. 4 is a simplified block diagram of a system that performs color matching in accordance with another embodiment of the present invention.

In FIG. 4, calculate block 24 forwards the calculated X, Y and Z tristimulus value to data storage block 25. For example, data storage block 25 is implemented using a bank of registers or a block of random access memory (RAM).

A data processing block 26 performs any desired additional processing. For example the additional processing could include conversion to different color coordinates, such as to x, y or u', v' color coordinates.

An external interface block 27 provides communication and data transfer between color matching system 27 and other external entities such as a separately implemented LED feedback controller. For example, external interface block 27 provides communication using serial $I^2C$ protocol, μ-wire protocol, a wireless communication protocol or some other communication protocol.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method to provide optical feedback for controlling color of light from a light source, the method comprising:
   detecting incident optical energy of the light as a function of discrete steps of wavelength;
   for each discrete step of wavelength, producing an X, Y and Z tristimulus subvalue;
   summing together the X, Y and Z tristimulus subvalues for all the discrete steps to produce X, Y and Z tristimulus values for the light; and,
   using the X, Y and Z tristimulus values as feedback in controlling color of the light generated by the light source.

2. A method as in claim 1 wherein detecting incident optical energy of the light as a function of discrete steps of wavelength, includes:
   producing a spectrum of the light in discrete steps so that incident optical energy is spatially separated as a function of wavelength.

3. A method as in claim 1 wherein detecting incident optical energy of the light as a function of discrete steps of wavelength, includes:
   using a diffraction grating to produce a spectrum of the light in discrete steps so that incident optical energy is spatially separated as a function of wavelength; and,
   locating an array of light-sensitive elements so as to receive different discrete steps of light.

4. A method as in claim 1 wherein detecting incident optical energy of the light as a function of discrete steps of wavelength, includes:
   using a prism to produce a spectrum of the light in discrete steps so that incident optical energy is spatially separated as a function of wavelength; and,
   locating an array of light-sensitive elements so as to receive different discrete steps of light.

5. A method as in claim 1 wherein producing an X, Y and Z tristimulus subvalue for each discrete step of wavelength includes:
   obtaining X, Y and Z tristimulus function values for each discrete step of wavelength; and,
   multiplying the obtained X, Y and Z tristimulus function values for each discrete step of wavelength by a value for the discrete step of wavelength that represents detected intensity of light.

6. A method as in claim 5 wherein the X, Y and Z tristimulus function values are CIE 1931 color matching function values.

7. A system that provides optical feedback on light color, the system comprising:
- a detector that detects incident optical energy of light as a function of discrete steps of wavelength; and,
- a calculator that sums together X, Y and Z tristimulus subvalues for all the discrete steps to produce an X, Y and Z tristimulus value for the detected light;
- wherein the X, Y and Z tristimulus values are used as feedback in controlling color of the light as generated by a light source.

8. A system as in claim 7 wherein the detector produces a spectrum of the light in discrete steps so that incident optical energy is spatially separated as a function of wavelength.

9. A system as in claim 7 wherein the detector includes:
- a diffraction grating used to produce a spectrum of the light in discrete steps so that incident optical energy is spatially separated as a function of wavelength; and,
- an array of light-sensitive elements located so as to receive different discrete steps of light.

10. A system as in claim 7 wherein the detector, includes:
- a prism used to produce a spectrum of the light in discrete steps so that incident optical energy is spatially separated as a function of wavelength; and,
- an array of light-sensitive elements located so as to receive different discrete steps of light.

11. A system as in claim 7 wherein the calculator produces X, Y and Z tristimulus subvalues for each discrete step of wavelength by multiplying obtained X, Y and Z tristimulus function values for each discrete step of wavelength by a value for the discrete step of wavelength that represents detected intensity of light.

12. A system as in claim 11 additionally comprising:
- a table that stores the X, Y and Z tristimulus function values obtained by the calculator.

13. A system as in claim 12 wherein the X, Y and Z tristimulus function values are CIE 1931 color matching function values.

14. A system that provides optical feedback on light color, the system comprising:
- detection means for detecting incident optical energy of light as a function of discrete steps of wavelength; and,
- calculation means for summing together X, Y and Z tristimulus subvalues for all the discrete steps to produce an X, Y and Z tristimulus value for the detected light;
- wherein the X, Y and Z tristimulus values are used as feedback in controlling color of the light as generated by a light source.

15. A system as in claim 14 wherein the detection means produces a spectrum of the light in discrete steps so that incident optical energy is spatially separated as a function of wavelength.

16. A system as in claim 14 wherein the detection means includes:
- a diffraction grating used to produce a spectrum of the light in discrete steps so that incident optical energy is spatially separated as a function of wavelength; and,
- an array of light-sensitive elements located so as to receive different discrete steps of light.

17. A system as in claim 14 wherein the detection means, includes:
- a prism used to produce a spectrum of the light in discrete steps so that incident optical energy is spatially separated as a function of wavelength; and,
- an array of light-sensitive elements located so as to receive different discrete steps of light.

18. A system as in claim 14 wherein the calculation means produces X, Y and Z tristimulus subvalues for each discrete step of wavelength by multiplying obtained X, Y and Z tristimulus function values for each discrete step of wavelength by a value for the discrete step of wavelength that represents detected intensity of light.

19. A system as in claim 18 additionally comprising:
- table means for storing the X, Y and Z tristimulus function values obtained by the calculation means.

20. A system as in claim 19 wherein the X, Y and Z tristimulus function values are CIE 1931 color matching function values.

* * * * *